Patented Dec. 10, 1946

2,412,327

UNITED STATES PATENT OFFICE 2,412,327

PROTEINOUS PLASTICS

George E. Eilerman, Milwaukee, Wis., assignor to Pittsburgh Plate Glass Company, Allegheny County, Pa., a corporation of Pennsylvania No Drawing. Application March 22, 1940, Serial No. 325,398

6 Claims. (Cl. 106—147)

The present invention relates to plastic compositions and it has particular relation to such compositions as comprise casein as their primary or principal ingredient.

One object of the invention is to provide a plastic composition from casein, or casein-like material, which is homogeneous and relatively flexible and strong even under conditions of relatively low atmospheric humidity.

This and other objects of the invention will be apparent from consideration of the following specification and the appended claims.

Casein and similar proteins have been widely used in the plastics industry for many years. Molded or extruded in the form of rods, sheets or tubes, a variety of manufactured articles, such as buttons, advertising novelties, and the like have been formed by shaping or stamping. In solution, it has been widely used as an adhesive in the manufacture of furniture, plywood, safety glass and other products. Casein is also widely used in the paper industry in the preparation of coated or enameled papers.

The use of casein as a binder for paint is quite old although until recent years its use has been limited in this country. Improvements in quality have led to increased use and both casein solution and powder paints are now important articles of commerce.

More recent developments include the production of films or transparent paper and protein textile fibers. Films are formed by a variety of means: by feeding powder to the inner face of a band that passes around a molding cylinder, by casting a casein solution and by extrusion of very thin sheets. In the production of artificial fibers, casein solutions are extruded into a coagulating bath and the resultant fibers are "tanned" with formaldehyde.

The most serious weakness of casein plastic material derives from the readiness with which casein absorbs and releases water. The material not only absorbs water when soaked, but it also "breathes" with changes in relative humidity of the surrounding air. Absorption of large amounts of water causes softening and swelling; drying causes hardening and contraction which weakens the material and causes fracture. This tendency although greatly reduced by the hardening or "tanning" action of formaldehyde or other aldehydes has eliminated casein plastics from consideration for certain uses and has seriously restricted it in others.

Perhaps the most serious aspect of the behavior of casein plastics toward water vapor is that of drying out at low relative humidity and becoming brittle.

It has now been found that these properties of casein may be improved by incorporation with it in suitable proportion and by suitable means, a compound selected from the group consisting of hydroxylated organic acid amides. More specifically these modifying agents may be defined as organic amides derived from the condensation of hydroxy- or polyhydroxy - alkyl amines with organic carboxylic or sulfonic acids. They then may be looked upon as conforming to one of the following general formulae:

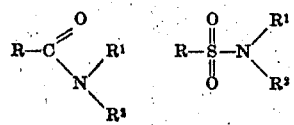

wherein R represents an alkyl or aryl radical which may or may not be further substituted by modifying groups. $R^1$ represents an alkyl radical containing two or more carbon atoms, at least one of which is not directly attached to nitrogen but is further substituted by a hydroxyl group or a water solubilizing derivative thereof and $R^2$ may be a member of the same group of radicals or hydrogen. The simplest molecule conforming to such a structure is that of the condensation product of formic acid with ethanolamine; N-hydroxy-ethyl formamide:

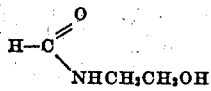

The amides of hydroxylated alkyl substituted phosphoric acid are also contemplated as being within the scope of the invention. An example of such substituted phosphoric acid would be the monoethylol phosphoric acid obtained by reaction of alcohol with phosphoric acid under appropriate conditions.

In general the amides contemplated by the invention may be considered as being the reaction products of a hydroxy amine of the type

where one of the groups is hydroxy or polyhydroxy alkyl, while the other is hydrogen, hydroxy alkyl, or simply alkyl. These amines are then reacted with a carboxylic acid which may contain one, two or three carboxyl groups. Examples of such acids are acetic acid, propionic, butyric, isobutyric, caproic, sebacic, lauric, levulinic, caprylic, oleic, adipic. Aromatic carboxylic acids which may be employed include naphthenic acid, benzoic acid, salicylic acid, etc. Examples of sulfonic acid which may be reacted with hydroxy amines to provide compounds contemplated by the present invention include benzene sulfonic, para toluene sulfonic acid, and the like.

The simplest compound conforming to the structure contemplated in the modifiers covered by the present invention is the condensation product of acetic acid and ethanol amine. This compound is termed N-hydroxyethyl acetamide.

In the present compositions, the action appears to be one of improving the homogeneity of the base casein. Added to solutions of casein, the new modifying agents bring about a reduction in viscosity and the resultant casein in its final form shows increased strength and flexibility.

The difference is particularly apparent at low relative humidities. Under average conditions of temperature and humidity, casein plastics are reasonably satisfactory in strength and flexibility. It has long been recognized that these properties are closely related to the moisture content of the casein. At low relative humidity, the casein loses water vapor to the surrounding air and the plastic loses strength and becomes brittle. This tendency, always undesirable, is particularly disturbing in such an application as that in a transparent wrapping material. The wrapping of perishable food products, for example, or of other articles ordinarily stored at low temperatures is seriously restricted by this limitation. Casein compositions containing the new modifying agents, on the other hand, overcome to a considerable degree this loss of flexibility and strength at low relative humidity. While it is believed that the plastic loses moisture vapor as do other casein compositions, the normal effect of the loss is greatly decreased.

Thus the effects observed are, in some manner still unknown, related to the changing moisture content of the casein plastic.

The hydroxylated organic amides can be added to the casein during the preparation of a plastic mass by any of the usual processes. The method will vary depending upon the application for which the product is intended. In many, if not most of its applications, casein is first dispersed in aqueous alkaline or acid solutions which may be used as such after addition of suitable preservatives, fillers, modifiers, etc., or may be reprecipitated with acid and pressed before use. In either case, the hydroxylated amide may be added to the alkaline or acid solution or during its preparation. In some applications, the casein is mixed with a limited amount of water in a dough mixer or similar device. In applications of this type, the hydroxylated amide may be added directly in the mixer wherein it is readily distributed throughout the casein mass.

In other words, the modifiers may be added in any of the usual processes without difficulty. Other agents, such as pigments, dyestuffs, softening agents, fillers, preservatives, etc., may also be added if desired. It may be pointed out that the hydroxylated amides are themselves preservatives for casein and that frequently other preservatives may be omitted when the former are used in the formulation.

It has also been found that the hydroxylated organic amides have a similar effect on vegetable caseins. Soybean casein, for example, which has been used in place of milk casein in many applications, is also improved by addition of these compounds. The modifying agents are used in an exactly similar manner with both proteins and increase the strength, flexibility and resistance to low relative humidity to a similar degree.

Formulations of casein have been prepared for a variety of applications containing a variety of representatives of this class of compounds. The following is a partial list of the compounds from which those tested were chosen:

1. N-$\beta$-hydroxyethyl acetamide
2. N-$\beta$-hydroxyethyl propionamide
3. N-$\beta$-hydroxyethyl butyramide
4. N-$\beta$-hydroxyethyl formamide
5. N-$\beta$-hydroxyethyl caproamide
6. N-$\beta$-hydroxyethyl isobutyramide
7. N-$\beta$-hydroxyethyl amide of acids from oxidized petroleum hydrocarbons
8. N-$\beta$-hydroxyethyl caprylamide
9. N-$\beta$-hydroxyethyl capramide
10. N-$\beta$-hydroxyethyl lauramide
11. N,N'-di-$\beta$-hydroxyethyl sebacamide
12. N-bis-($\beta$-hydroxyethyl) propionamide
13. N-$\beta$-hydroxyethyl amide of naphthenic acids
14. $\alpha$-Hydroxy-N-$\beta$-hydroxyethyl isobutyramide
15. N,N'-di-$\beta$-hydroxyethyl adipamide
16. 2-Ethyl-N-$\beta$-hydroxyethyl hexoamide
17. N-$\beta$-hydroxyethyl amide of commercial linseed oil acids
18. N-Caproyl-tetrahydro-1,4,2-oxazine
19. N-di-$\beta$-hydroxyethyl caprylamide
20. N-$\beta$-hydroxyethyl oleamide
21. N-bis-($\beta$-hydroxypropyl) caprylamide
22. N-$\alpha,\alpha$-dimethylolethyl caprylamide
23. N-trimethylolmethyl capyrylamide
24. N-$\beta$-hydroxyethyl levulinamide
25. N-$\omega$-hydroxynonyl acetamide
26. N-$\beta$-hydroxyethyl benzenesulfonamide
27. N-$\beta$-hydroxyethyl-p-toluenesulfonamide
28. N-$\alpha$-hydroxypropyl caproamide
29. N-bis-($\beta$-hydroxyethyl) formamide
30. N-bis-($\beta$-hydroxyethyl) acetamide The proportions of modifiers employed in the casein will vary depending upon the particular requirements. However, the ratio will in general fall within a range of about 1 to 20 per cent. Any two or more of the modifiers may be employed in equal or unequal amounts. Plasticizers, such as higher fatty alcohols, glycerine, and the like, some of which are mentioned in French Patent No. 420,543, German Patent No. 313,881, British Patent No. 115,434, German Patent No. 540,723, U. S. Patents Nos. 2,109,439, 1,772,131 and 1,775,175, may also be added in amounts, for example, of 3 to 20 per cent.

In the following specific examples, there are described base casein solutions and plastic masses to which may be added other modifying agents, softening agents, fillers, pigments, dyestuffs, preservatives, etc., depending upon the requirements of the application in mind.

*Preparation of casein solutions—Example 1.—* 50 parts of milk casein are soaked in 250 parts of water until the protein is thoroughly moistened throughout. The charge is heated and held at 50–60 degrees C. under strong slow agitation and there is gradually added sufficient 10 per cent aqueous caustic soda solution to dissolve the casein. For most uses, it is not desirable to increase the alkalinity beyond a pH of 6.7 to 7.0 although the alkalinity may be varied beyond these limits depending on the requirements of the use for which the solution is designed. After the casein has been completely dissolved, 2.5 to 7.5 parts of N-β-hydroxyethyl caproamide are added and the solution is stirred until again homogeneous.

The base casein solution is now ready for use and may be used as such, or may be further modified to meet specific requirements. If an adhesive for use in the furniture or plywood industries is desired, calcium hydroxide in amounts of 10 to 20 per cent may be added, stirred into the solution, and other agents, such as sodium silicate may also be added in an amount of 20 to 40 per cent.

The solution may be further diluted and extruded into an acid formaldehyde bath for the formation of artificial fibers, or it may be cast as such to form transparent film. In either case, other modifying agents, such as fatty acid soaps (see U. S. Patent No. 2,140,273), higher alcohols, and the like may be added before conversion of the casein to its final form.

Alternatively, the solution may be used for the coating of paper. In this case, pigments, such as calcium carbonate $TiO_2$, clay in amounts of 60 to 80 per cent, are generally added and the solution is adjusted to the desired viscosity by dilution with water. The solution is applied by dipping, brushing, spraying, or other methods, and is then dried.

In other words, whatever the intended use the hydroxylated alkyl amides may be advantageously employed to improve the casein in its final form. The improvement reflects itself in improved cohesive strength and flexibility of the final casein particular when the finished article is exposed at low relative humidity for any extended period of time.

It will be understood that the N-β-hydroxyethyl caproamide can be replaced by other members of the series defined above. Thus N-β-hydroxyethyl caprylamide and N-trimethylolmethyl caprylamide have been found particularly effective for the purpose. Other alkaline reagents, such as caustic potash, ammonium hydroxide and the like may be used to replace the caustic soda for dissolving the casein. The degree of alkalinity and the percentage of hydroxy alkyl amide added may be varied depending on the nature of the use for which the solution is intended.

*Example 2.*—A base casein solution may be prepared using an organic base as the dissolving agent for the casein. Thus, 100 parts of casein soaked in 500 parts of water are dissolved by addition of triethanol amine in amounts sufficient to result in a final pH of 6.5 to 7.0. To this solution held under strong slow agitation of 50-60 degrees C. are added 5 to 15 parts of N-α-hydroxypropyl caproamide and the solution is stirred until again homogeneous.

The solution is now ready for use and is particularly suitable for the manufacture of transparent film. It is usually desirable to add other modifiers, such as plasticizers or softening agents, such as glycerol, higher alcohols, fatty acid soaps, and the like in amounts of say, 3 to 20 per cent, after which the solution is cast on glass or polished metal surfaces. The film may be hardened by after treatment with formaldehyde or other "tanning" agents.

The use of hydroxy alkyl amides is particularly advantageous in this application where the casein is unsupported in its final form. The resultant films show no reduction in transparency and are greatly improved in flexibility at low relative humidity.

The N-α-hydroxypropyl caproamide may be replaced by N-β-hydroxyethyl p-toluenesulfonamide, N-β-hydroxethyl butyramide or other members of series defined above without losing the advantages described. The triethanolamine may be replaced by other organic bases, such as triisopropanolamine, diethanolamine, morpholine, and the like.

*Example 3.*—A solution is prepared by adding 20 parts of borax to a suspension of 188 parts of casein in 656 parts of water at 75-80 degrees C. The casein is thoroughly soaked in the water before addition of the borax. This operation is best brought about in a dough mixer or similar equipment because of the very high viscosity of the suspension and the resultant solution. As soon as the casein mass is completely homogeneous, 3.5 to 15 parts of N-β-hydroxyethyl capramide is added. As the latter reagent disperses in the solution, there is a marked decrease in viscosity of the solution.

The solution is particularly adapted to use as the vehicle for a casein paste paint. Pigments, such as finely divided calcium carbonate, lithopone barytes, and the like, may be added in appropriate amounts; e. g., 20-30 per cent. Pigments are more readily mixed into the vehicle and the operation is generally simplified as compared with conventional casein paints. The resulting paints are improved by virtue of the improved flexibility of the base casein and brushing properties are likewise improved.

Other mild alkalies, such as mixtures of sodium carbonate, sodium fluoride and borax, trisodium phosphate, and the like may be used. The N-β-hydroxyethyl capramide may also be replaced using other amides selected from the series defined above. Other film forming agents, such as linseed or other drying oils and natural or synthetic resins, may be incorporated in the finished paint by use of suitable emulsifying agents.

Films after application may be tanned with alum or the like agent.

The application of the invention to acidic solutions is illustrated by the following example:

*Example 4.*—40 parts of milk casein are mixed with 250 parts of water containing 5 parts of formic acid and 6 parts of glycerine as a modifier. The resulting suspension is heated under vigorous agitation to 80-95° C. This temperature is maintained for 30-60 minutes, after which 4 parts of N-bis-β-hydroxyethyl) formamide and 15 cc. of ten per cent formalin are added. The resulting thin solution may be cast and dried to a flexible film or may be used as a coating material. It must be applied while still hot, since it sets to a gel upon cooling. Pigments, fillers, dye stuffs, and the like may be used if desired.

Other acid solvating agents such as acetic acid may be substituted for formic acid. Other modifying agents than glycerine may be added if desired. Those herein listed as "plasticizers" are examples of such modifiers.

*Preparation of plastic casein masses—Example 5.*—A modified powder is prepared by mixing 100 parts of about 40 mesh casein, 35 parts of water and 5 parts of N-β-hydroxyethyl caprylamide in a dough mixer or other suitable equipment at room temperature. The powder is converted into a heavy homogeneous plastic mass by heat and pressure and may be readily extruded or molded in the form of rods, sheets or shaped articles. The moldings which are translucent and homogeneous may be hardened in the usual manner with formaldehyde or other "tanning" agents and are useful for the fabrication of buttons, buckles, advertising novelties, and the like.

The casein composition may be extended by addition of wood flour, ground asbestos, or the like in any appropriate amount; e. g., 25 to 75 per cent. Casein in fluid form prepared as herein disclosed may be employed as a cement to bond nitrocellulose or cellulose acetate films to glass.

The hydroxy alkyl amide does not exude during molding or extrusion and does not appear to leach out in the aqueous formaldehyde during the hardening process. Thus, it remains and improves the flexibility of the finished article after all subsequent operations are complete.

Similar plastic masses can be prepared using a vegetable casein, such as that from soybean meal. In general, soybean casein develops somewhat more color than does the milk casein under these conditions, but is satisfactory when the absence of color is not essential to the utility of the finished article.

Dyestuffs, pigments, fillers and other modifying agents may be incorporated during the mixing operation. The proportion of water may be widely varied depending on the character of the initial casein and the requirements of the molding or extruding equipment. The hydroxy alkyl amide is preferably selected from the water insoluble members of the above defined series for obvious reasons.

The addition of amides of hydroxy amines, such as herein disclosed and phosphoric acid compounds or other organic acids containing at least 3 oxygen atoms in the acid group are contemplated. For example the diamide of ethyl propyl or butyl phosphoric acid and ethanolamine or the other amines herein disclosed might be added in an amount of 1 per cent or more, based on casein content.

Casein compositions as herein disclosed when formed into sheets are very clear, strong and non-brittle even at low humidities. They are well suited for use as coatings and transparent wrappings for foods, such as cheese, candy and the like, and may, if desired, be directly contacted with the food product. The sheets or other forms of the composition may be coated with nitrocellulose or wax or with compositions of nitrocellulose and a small amount of a high melting paraffin in order to increase moisture resistance. Such coated sheets are especially useful for wrappings for foods.

What I claim is:

1. As a new composition of matter a homogeneous blend of casein and N-β-hydroxyethyl benzenesulfonamide.

2. As a new composition of matter a homogeneous blend of casein and N-β-hydroxyethyl para toluenesulfonamide.

3. A composition which is relatively free from swelling or hardening as a result of gain or loss of moisture in the atmosphere, which composition comprises casein and a compatible amide of a sulphonic acid containing a single benzene nucleus and an aliphatic hydroxy amine, the reaction between the sulfonic acid and the amine involving the sulfo group and the nitrogen atom of the two, the hydroxyl of the amine being unreacted in the amide, said amide being present in amount sufficient to plasticize the casein.

4. A film which is resistant to absorption or loss of moisture in the atmosphere and which retains relatively uniform plasticity, said film comprising casein and an amide of sulfonic acid containing a single benzene nucleus and an aliphatic amine containing a hydroxy group, the hydroxy group of said amine remaining unreactive in the amide, said amide being present in an amount of about 1 to 20 percent of the composition.

5. A composition which is relatively free from swelling or hardening as a result of gain or loss of moisture in the atmosphere, which composition comprises casein and 1 to 20 percent of an amide of an aryl sulfonic acid containing a single benzene nucleus and an amine containing a hydroxy aliphatic group, said amide containing the hydroxy group in unreacted state, said composition being further treated with a tanning agent.

6. A coating composition comprising casein dissolved in water and further containing an amide of an aromatic sulfonic acid containing a single benzene group and an aliphatic hydroxylated amine, the hydroxy group of said amine being unreacted in the amide, the amide being in an amount to plasticize the casein.

GEORGE E. EILERMAN.